Aug. 19, 1947.  M. R. WINKLER  2,425,974

AUTOMATIC PHONOGRAPH

Original Filed June 26, 1940   12 Sheets-Sheet 1

Inventor:
Marion R. Winkler,
By McCaleb, Wendt &
Dickinson
Attorneys.

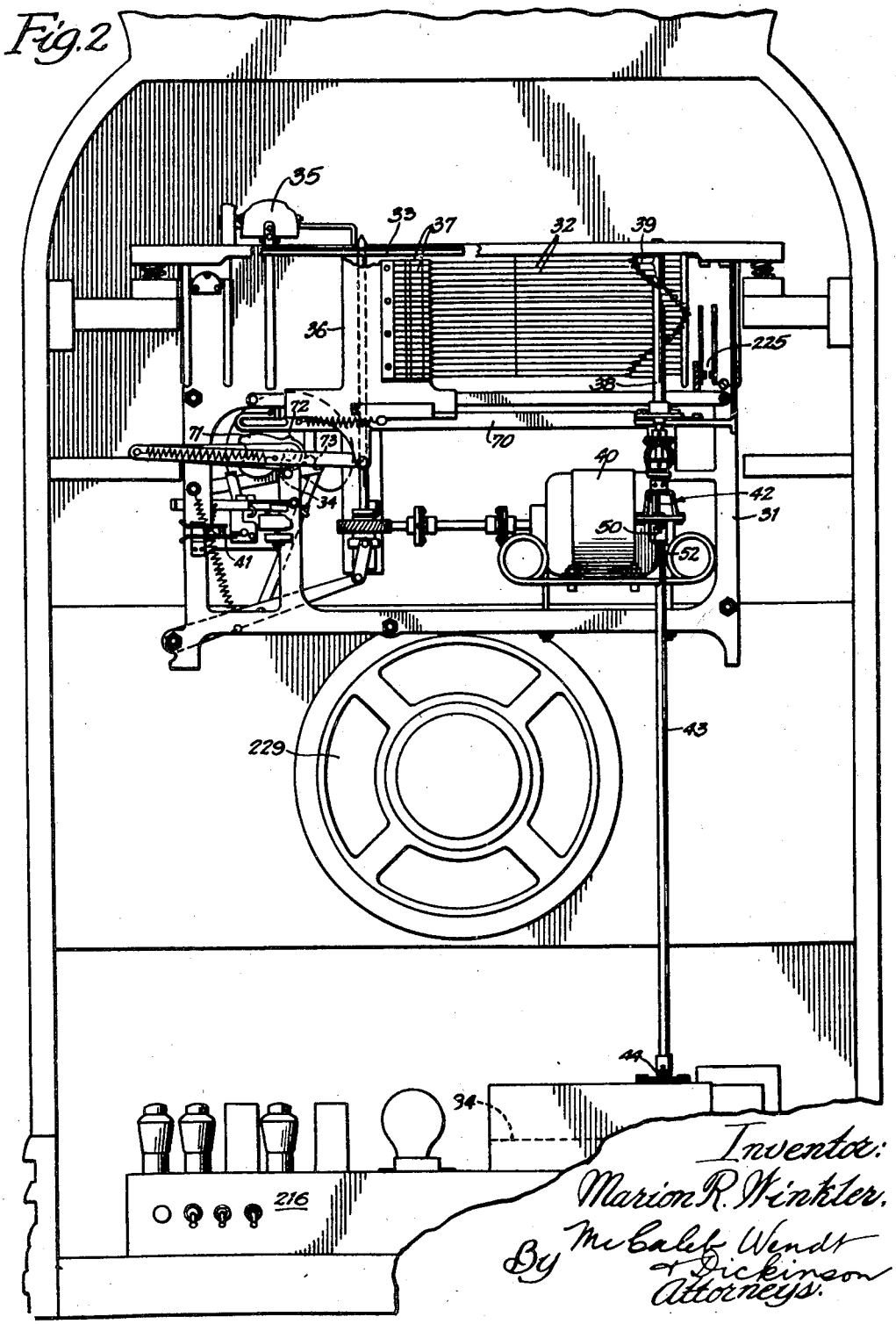

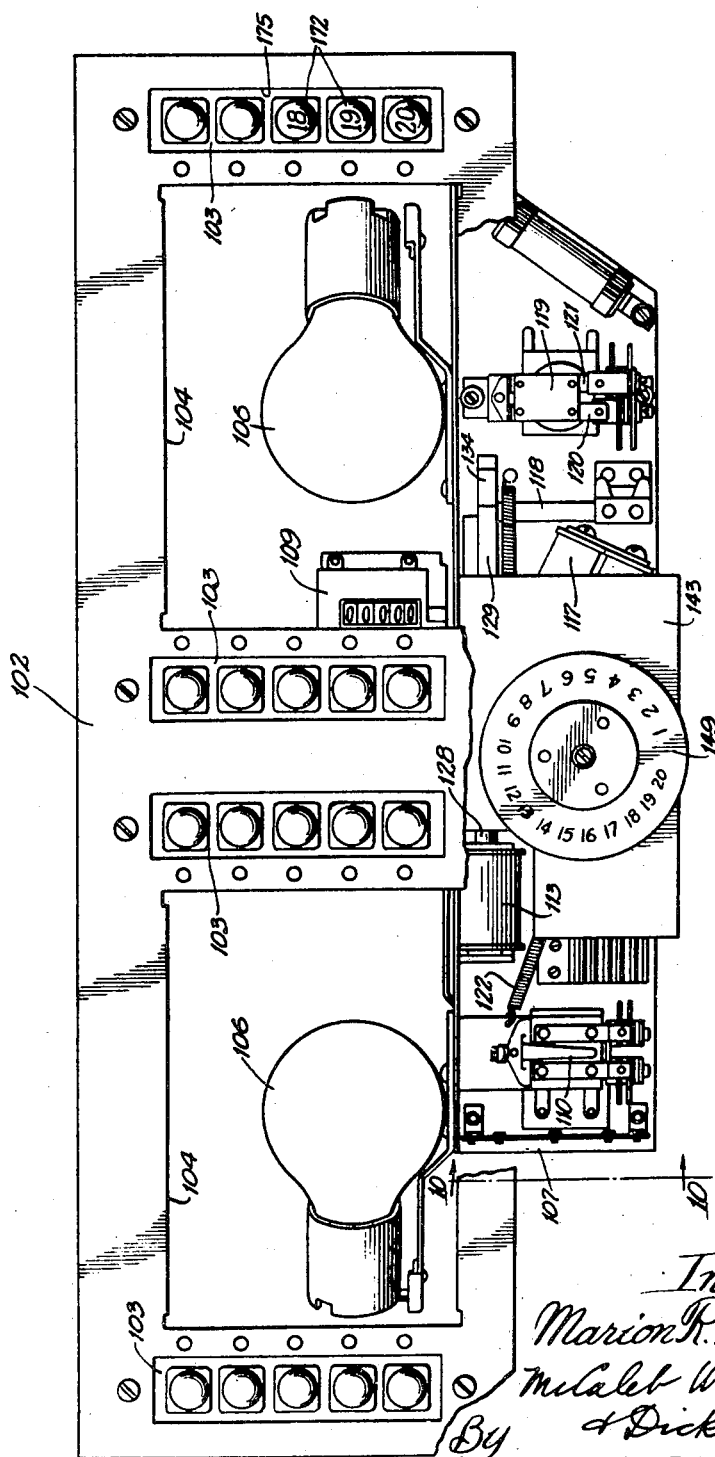

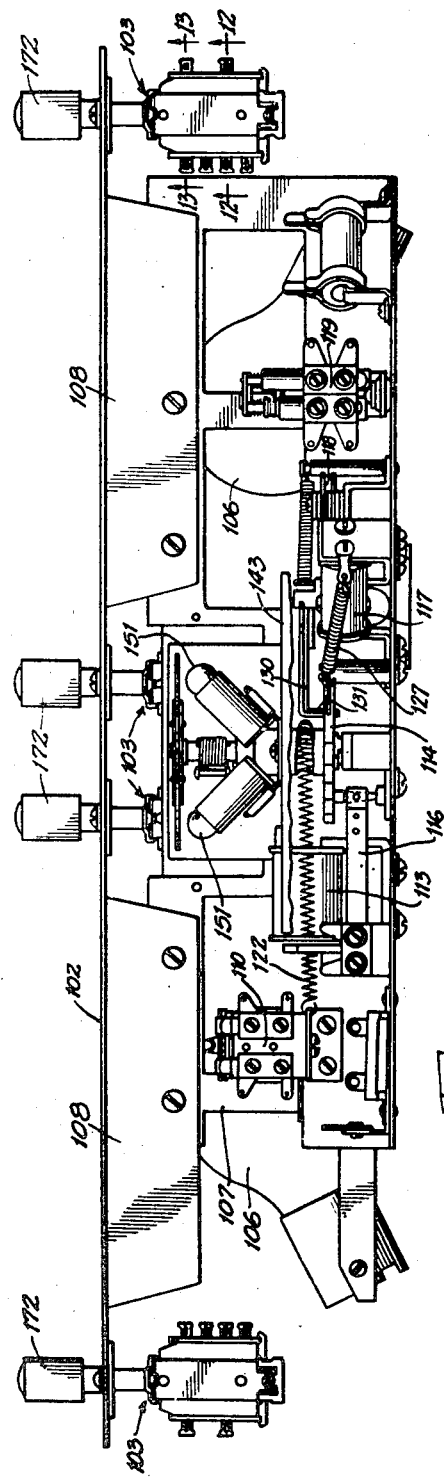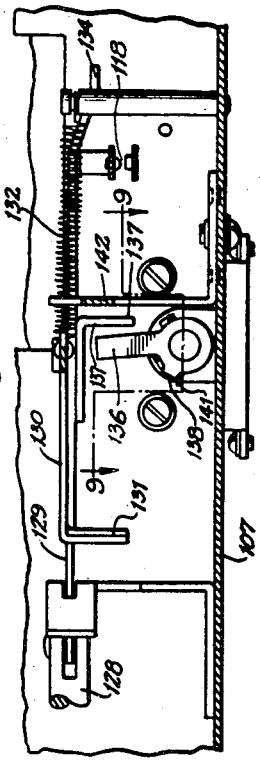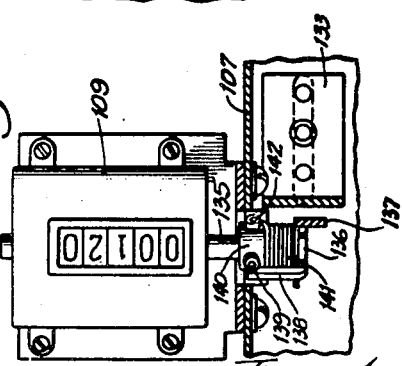

Aug. 19, 1947.  M. R. WINKLER  2,425,974
AUTOMATIC PHONOGRAPH
Original Filed June 26, 1940   12 Sheets-Sheet 5
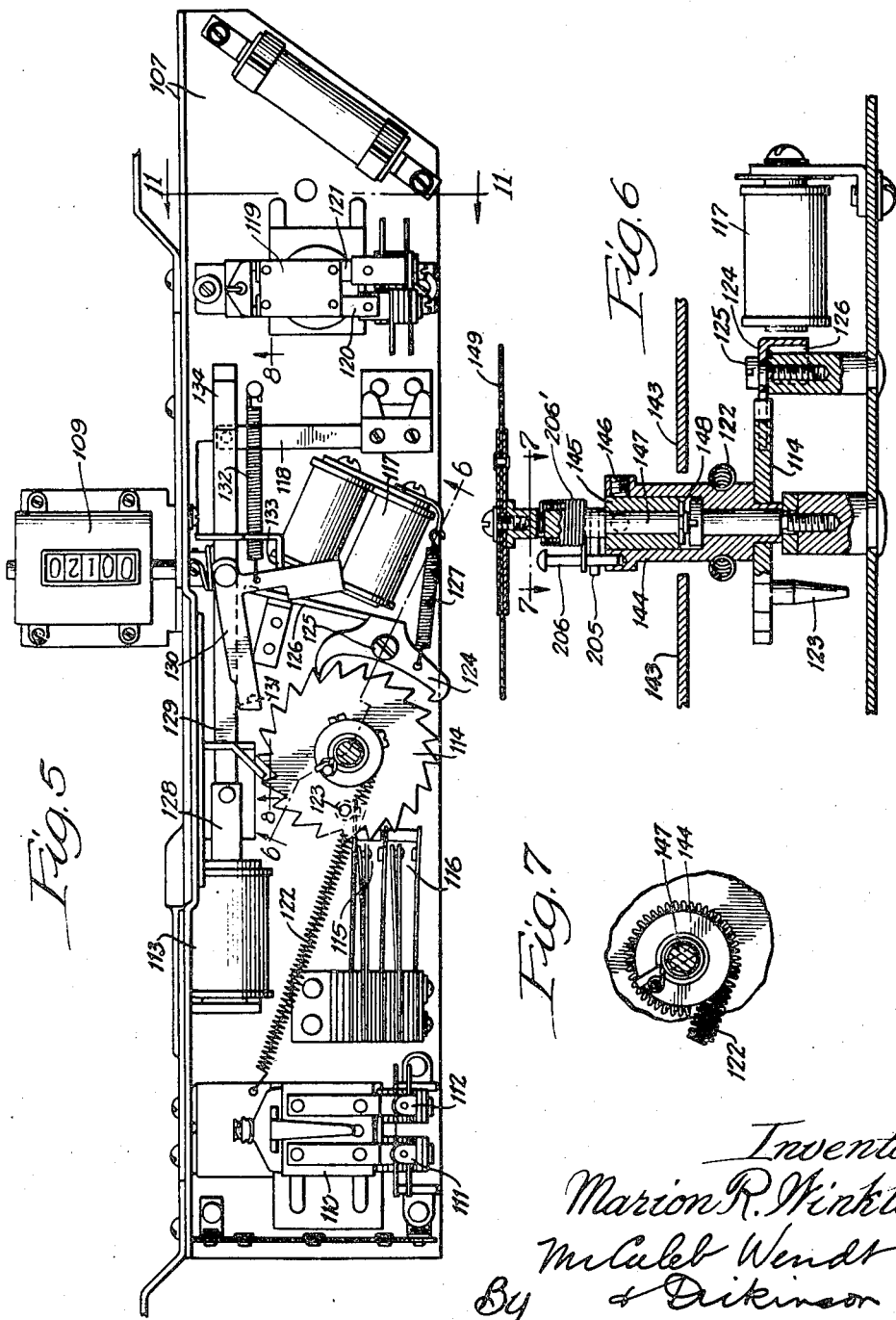
Inventor:
Marion R. Winkler
By McCaleb Wendt
& Dickinson
Attorneys.

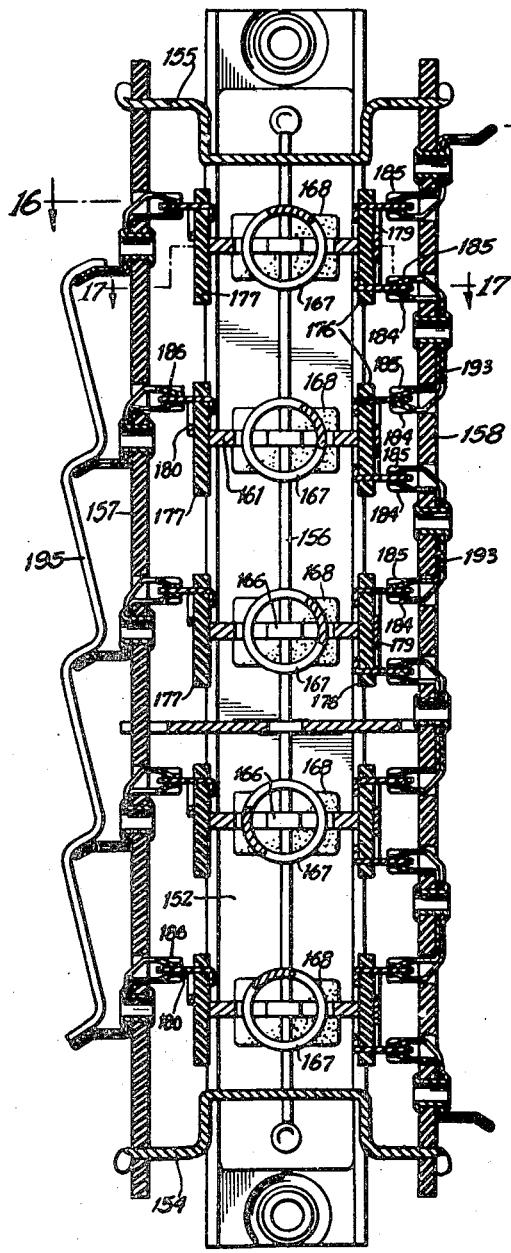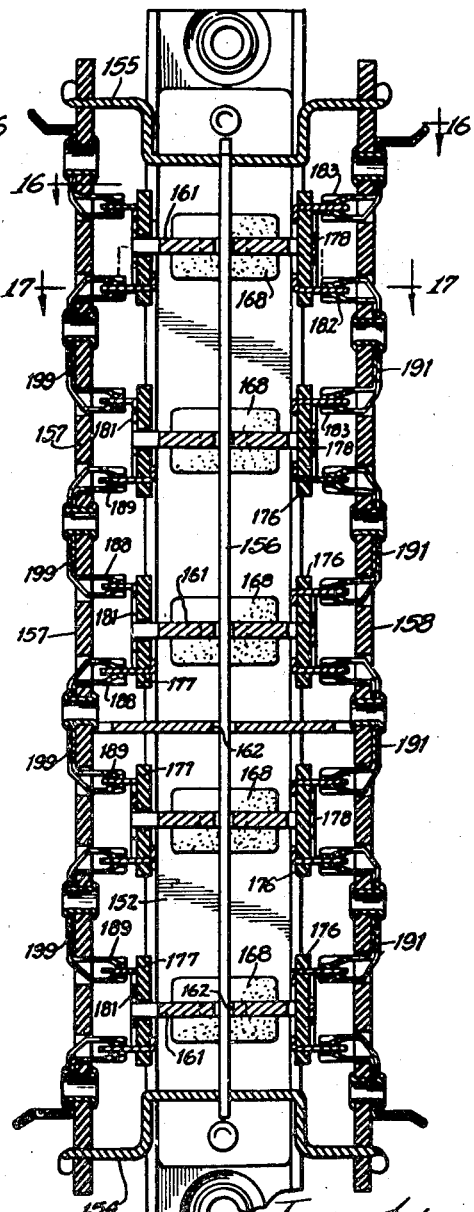

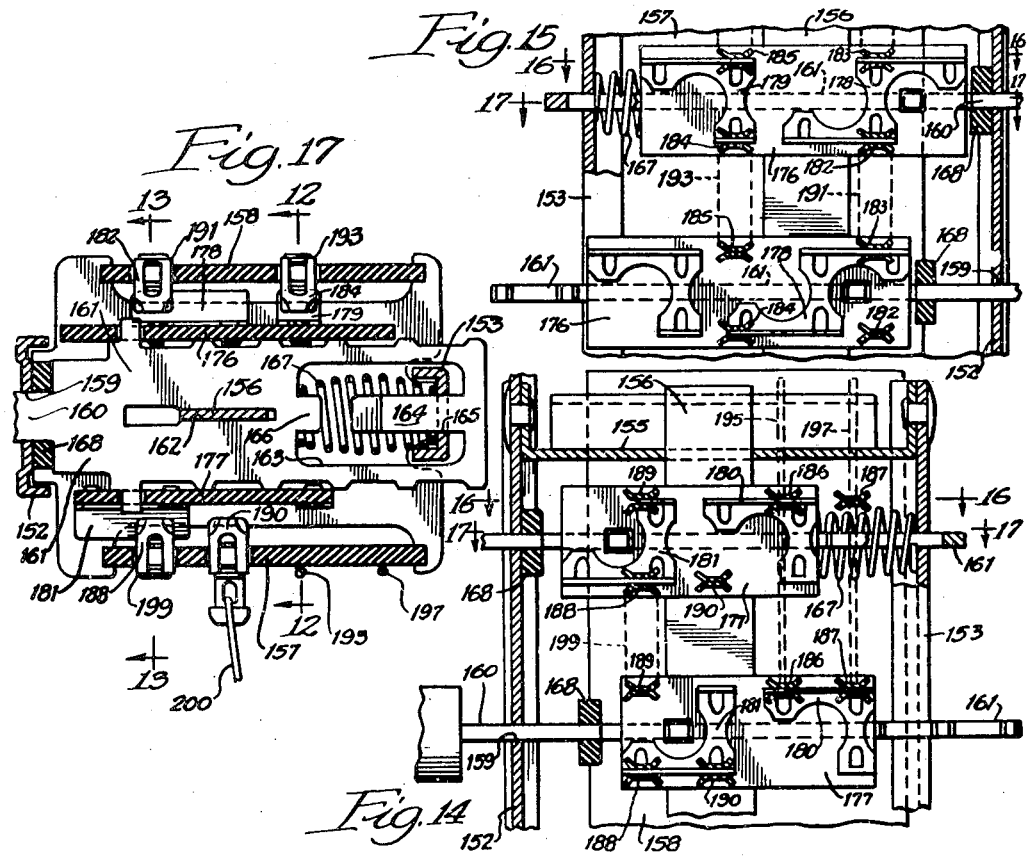
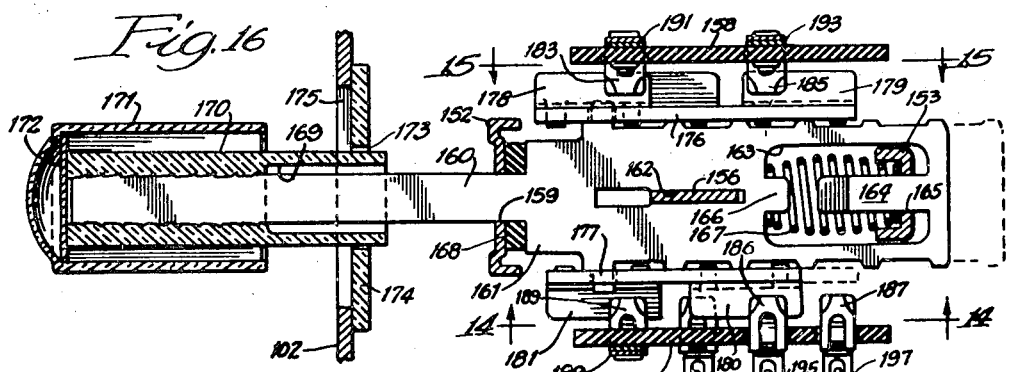

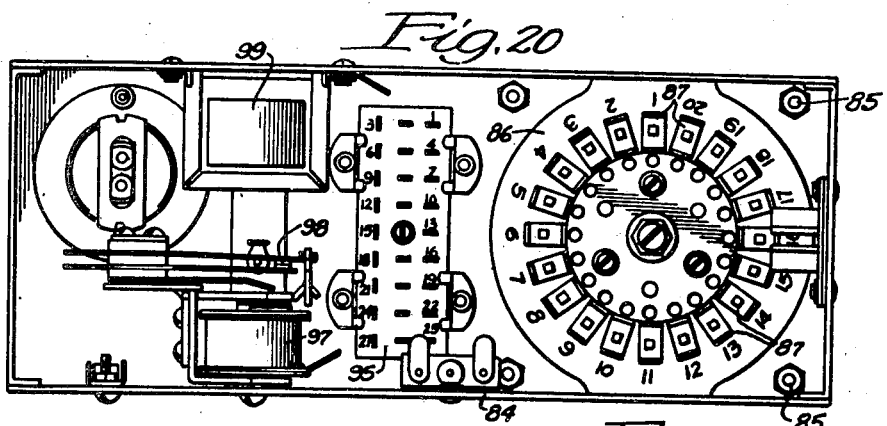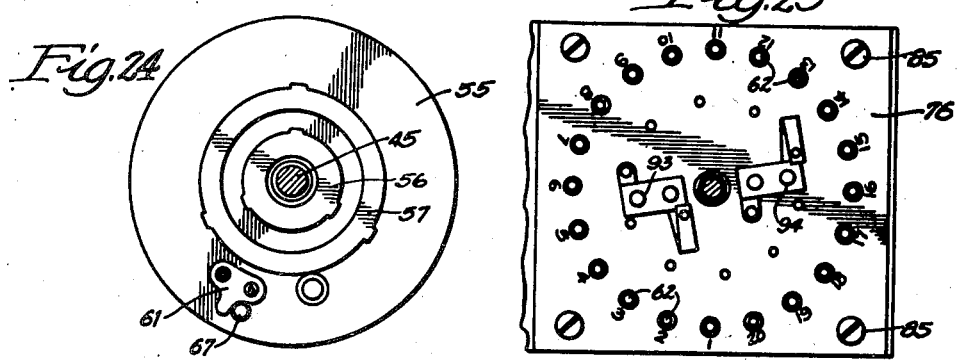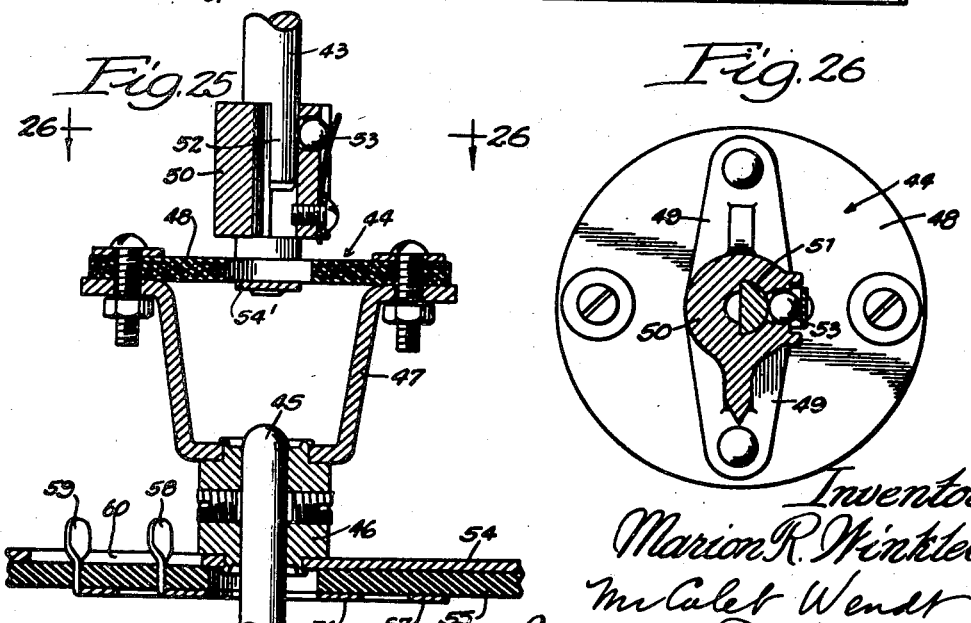

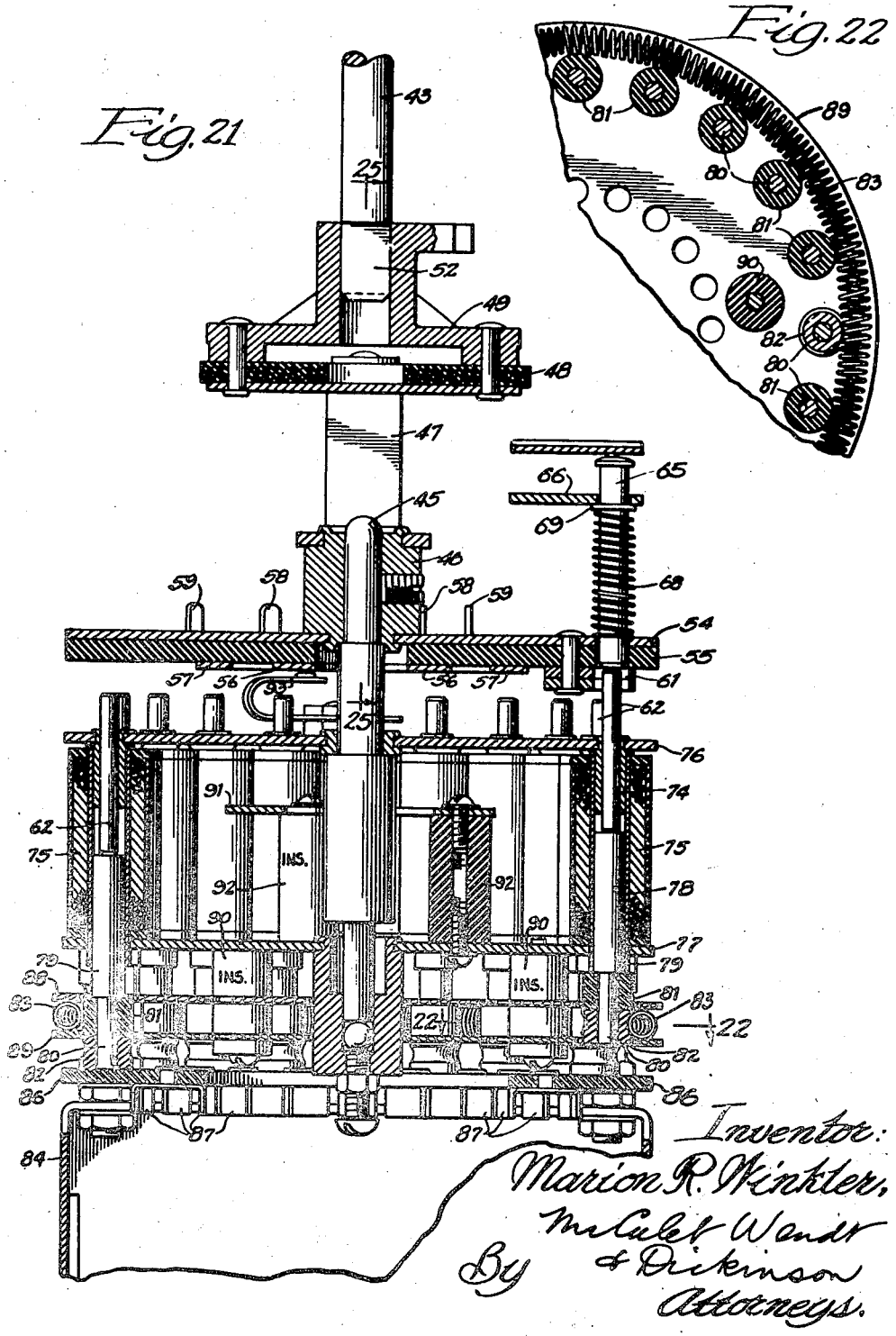

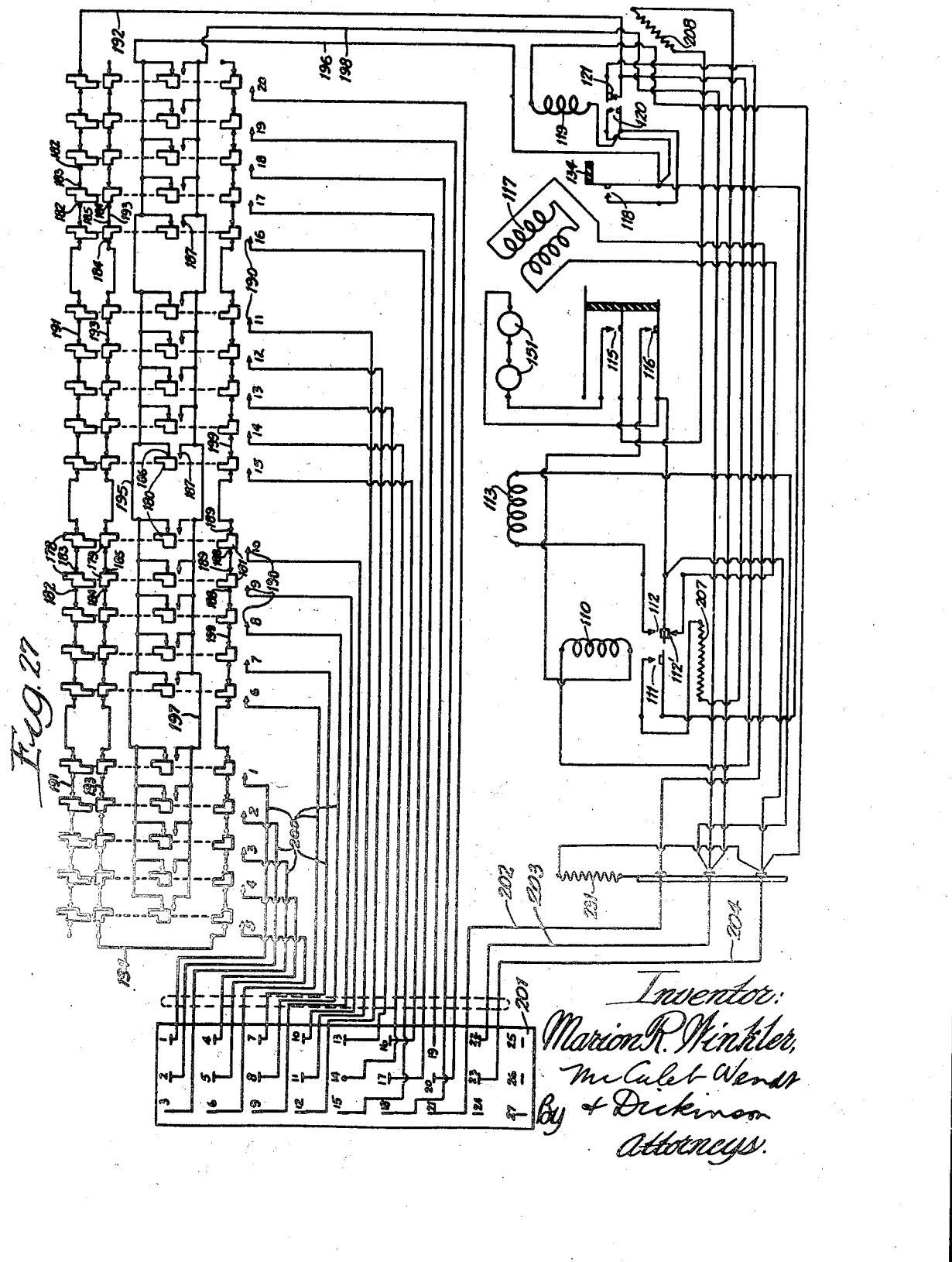

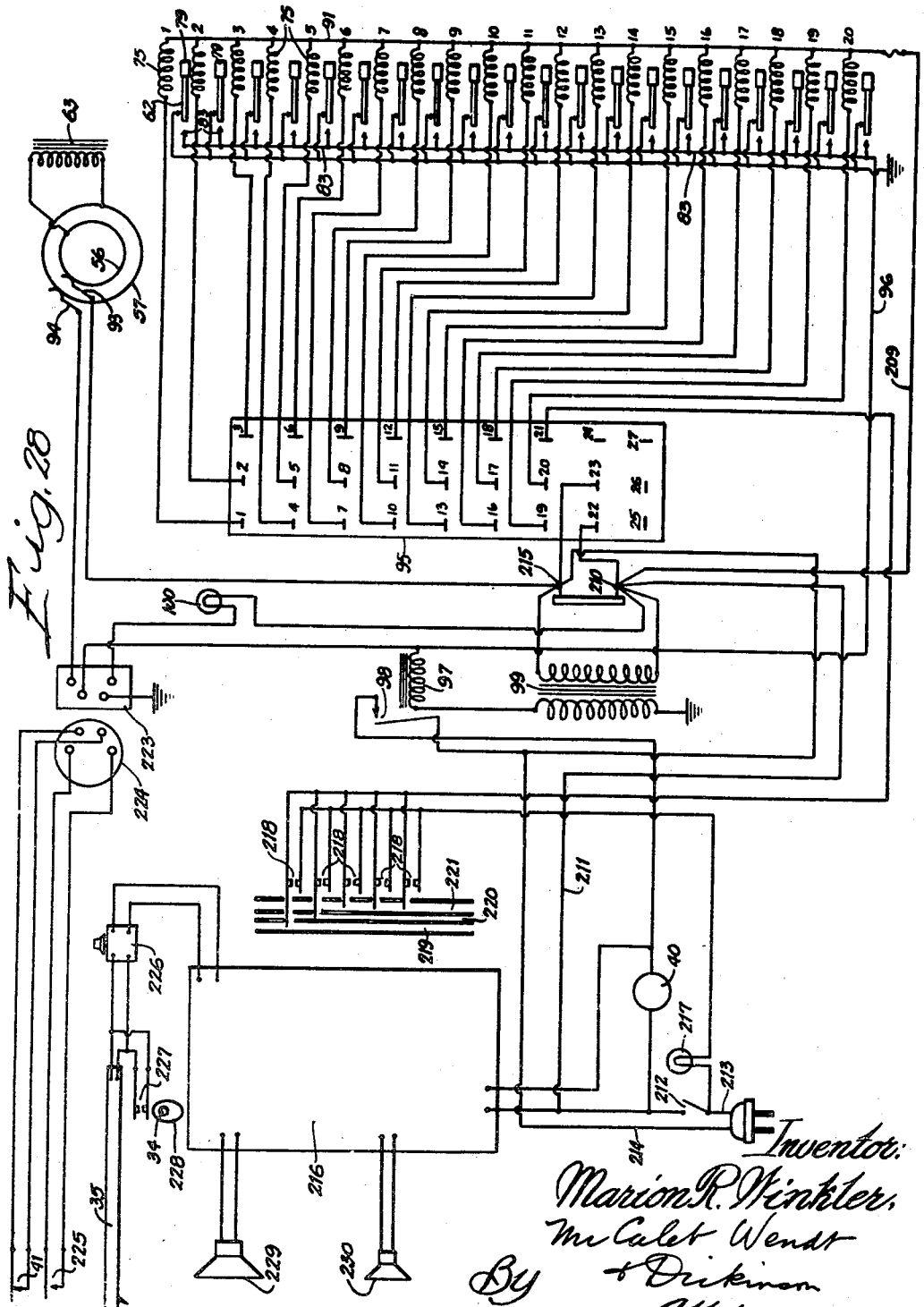

Patented Aug. 19, 1947

2,425,974

UNITED STATES PATENT OFFICE 2,425,974

AUTOMATIC PHONOGRAPH

Marion R. Winkler, Milwaukee, Wis., assignor to J. P. Seeburg Corporation, Chicago, Ill., a corporation of Illinois Original application June 26, 1940, Serial No. 342,419. Divided and this application February 17, 1942, Serial No. 431,252

20 Claims. (Cl. 194—15)

This application is divided from patent application Serial No. 342,419, filed June 26, 1940.

This invention relates to automatic phonographs and particularly to electrical selectors for such phonographs.

The invention particularly relates to automatic phonographs which are adapted to be put into operation by the insertion of a coin or coins so as to play one section or a plurality of selections, depending in number upon the number or value of coins inserted and which are provided with selector means whereby any particular recordings to be played can be predetermined by the operator.

One of the objects of the present invention is to provide an improved selector for such phonograph.

A further object of the invention is to provide an improved electrical selector for such a phonograph.

A further object of the invention is to provide a selector comprising means for storing credit and means for indicating the amount of credit thus stored.

A further object of the invention is to provide a phonograph having means for storing credit, selector means adapted to discharge said credit means step by step as selections are made, and means for transferring the credit and selections made to actuating means capable of storing a plurality of selections to be played successively.

Other objects, advantages and capabilities of the invention will appear from the following description of a preferred embodiment thereof taken in conjunction with the accompanying drawings, in which Figure 1 is a front view of the upper portion of a phonograph cabinet embodiment of my invention;

Fig. 2 is a rear view of the phonograph, the rear wall being partly broken away to show the internal mechanism;

Fig. 3 is a front view of the part of the selector mechanism which is carried on the front of the cabinet, certain portions being omitted to show the internal mechanism;

Fig. 4 is an inverted plan view of the mechanism shown in Fig. 3, parts of the mechanism being broken away to show internal elements;

Fig. 5 is a front view of the lower portion of the mechanism shown in Fig. 3, portions thereof being omitted to show internal structure;

Fig. 6 is a sectional detail view through the credit-storing mechanism, the section being taken on the broken line 6—6 of Fig. 5;

Fig. 7 is a sectional detail taken on the line 7—7 of Fig. 6;

Fig. 8 is a sectional detail taken on the line 8—8 of Fig. 5;

Fig. 9 is a fragmentary sectional view showing the play counter, the section being taken on the line 9—9 of Fig. 8;

Fig. 12 is a vertical section through one of the switch assemblies, the section being taken on the line 12—12 of Figs. 4 and 17;

Fig. 13 is a vertical section through one of the switch assemblies, the section being taken on the line 13—13 of Figs. 4 and 17;

Fig. 14 is a fragmentary sectional view of one of the switch elements, the section being taken on the line 14—14 of Fig. 16;

Fig. 15 is a fragmentary sectional view of one of the switch elements, the section being taken on the line 15—15 of Fig. 16;

Fig. 16 is a transverse sectional view through one of the switch elements, the section being taken on the line 16—16 of Figs. 12, 13, 14 and 15;

Fig. 17 is a similar view, the section being taken on the line 17—17 of Figs. 12, 13, 14 and 15;

Fig. 20 is an inverted plan view of the mechanism shown in Figures 18 and 19;

Fig. 21 is a sectional view through the solenoid assembly, the section being taken on the line 21—21 of Fig. 19;

Fig. 22 is a fragmentary sectional detail, the section being taken on the line 22—22 of Fig. 21;

Fig. 23 is a sectional plan view, the section being taken on the line 23—23 of Fig. 18;

Fig. 24 is a sectional view taken on the line 24—24 of Fig. 18;

Fig. 25 is a fragmentary sectional elevation, the section being taken on the line 25—25 of Fig. 21;

Fig. 26 is a sectional plan detail, the section being taken on the line 26—26 of Fig. 25;

Fig. 27 is a wiring diagram of the elements of the selector unit on the front wall of the cabinet; and Fig. 28 is a wiring diagram of the remaining electrical units.

The present invention may be embodied in automatic phonographs which are adapted for the selection of a plurality of individual records to be played successively. Such automatic phonographs are provided with a movable member capable of occupying a plurality of positions, each position corresponding to one of the records in the phonograph. In the present application, the invention is disclosed in its application to a phonograph of the type described and claimed in Patent No. 2,237,139, issued April 1, 1941, to Carl G. Freborg, and Patent No. 2,243,698, issued May 27, 1941, to Carl G. Freborg et al. This type of phonograph has been manufactured on an extensive scale by J. P. Seeburg Corporation and is in wide use throughout the United States, being known as the "Symphonola." It is, therefore, only necessary to give a brief description of the details of the phonograph other than those concerned with the selector. It will, however, be understood that the invention may be readily applied to other known types of multi-selecting automatic phonographs.

Figure 1:
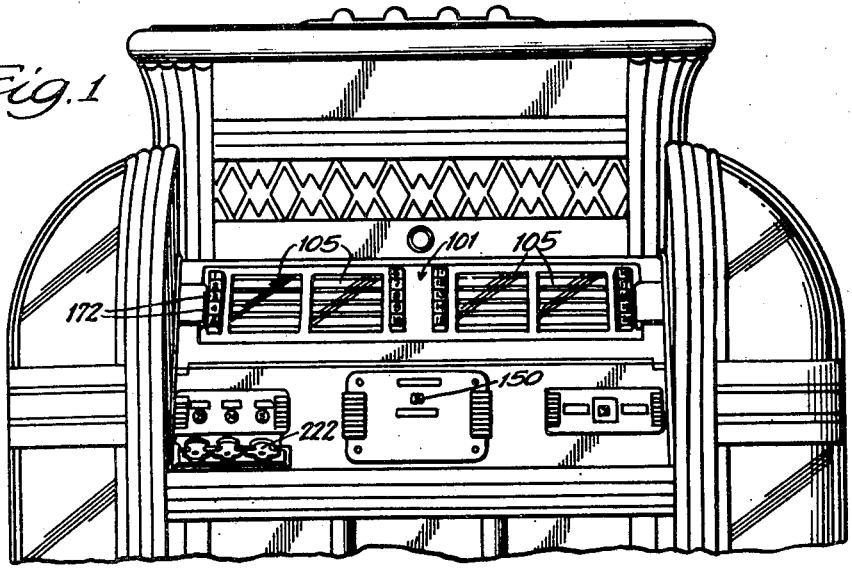
Figures 10, 11:
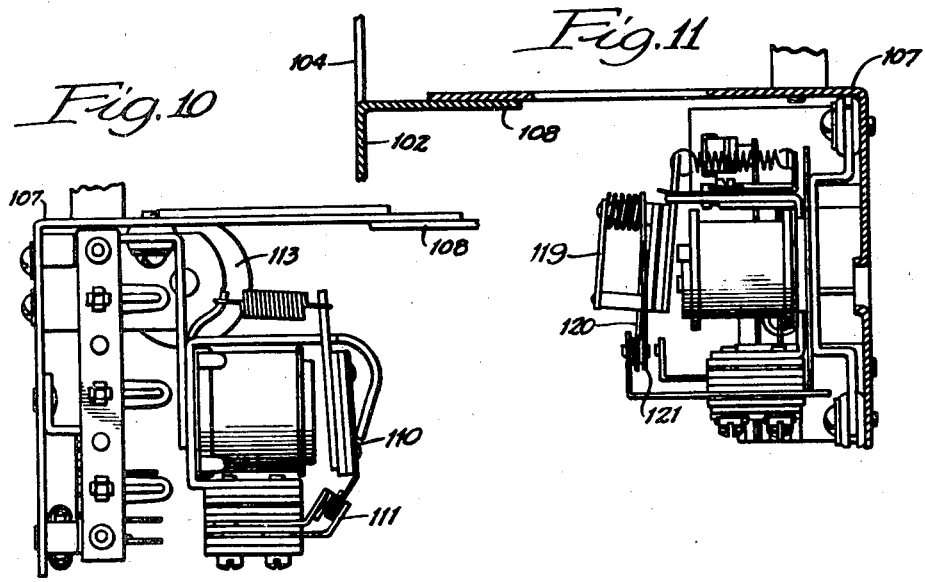
Fig. 10 is an elevational view of the left-hand end of the mechanism shown in Fig. 5.
Fig. 11 is a sectional elevational view of the mechanism shown in Fig. 5, the section being taken on the line 11—11 of Fig. 5.
Figure 19:
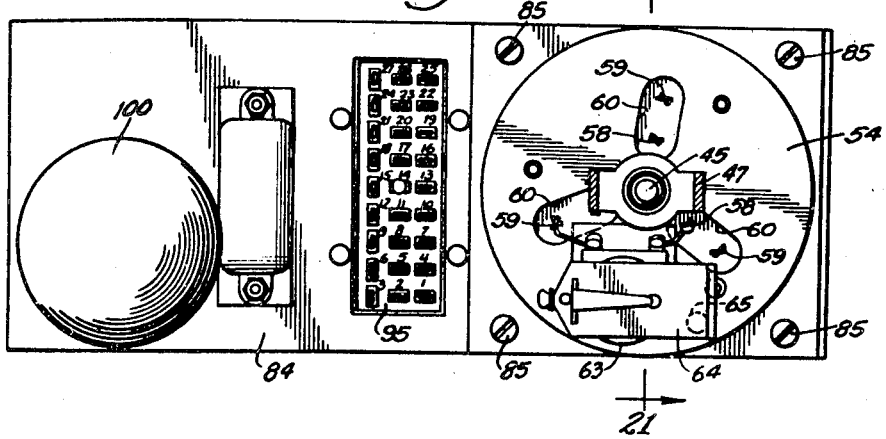
Fig. 19 is a plan view of the mechanism shown in Fig. 18 as viewed on the line 19—19 of Figure 18.

Referring to the drawings, the automatic phonograph referred to is shown in Figs. 1 and 2. This phonograph comprises a frame 31 on which are mounted a plurality of sliding frames 32 each of which carries a disc phonograph record which is adapted to be slid individually to the left as viewed in Fig. 2 into alignment with a turntable 33. The turntable is automatically actuated by a cam on a cam shaft 34 so that it rises through an opening in the frame 32 bringing the record on the frame upwardly into contact with the needle on a player arm 35.

At the end of the playing of a record, means controlled by the player arm 35 are brought into operation for effecting the record-changing cycle which is controlled by a single rotation of the cam shaft 34. During this cycle the turntable descends, and the player arm 35 is moved to initial playing position which is the position in which it is shown in Fig. 2.

During the rotation of the cam shaft 34, a carriage 36 is driven to the right from its position in Fig. 2 and is moved back to its initial position. The carriage 36 carries individual members 37 which are adapted to engage corresponding elements on the sliding frames 32. A shaft 38 carrying a plurality of arms 39 is adapted to be rotated during the initial part of the record-changing operation.

The arms 39 correspond in number to the number of sliding frames 32 and they are arranged longitudinally along the shaft 38 so as to engage the individual members 37 and connect them to the sliding frames 32. The arms 39 are angularly displaced progressively so that each arm 39 has an individual radial direction which is angularly displaced from all the other arms 39. The shaft 38 is rotated during each record-changing cycle through a distance corresponding to one revolution. If desired, it may have an additional angle of revolution.

The return of the player arm 35 to initial playing position, the rotation of the shaft 38, and the movements of the carriage 36 are effected by suitable mechanism operated by the cam shaft 34.

Assuming that a record has been played and the motor 40 is put into operation, then the cam shaft, being connected to the motor 40 by a clutch (not shown), is driven, and the sequence of operations is as follows: The turntable 33 is moved downwardly so as to place the record on the frame 32 which is in the left position. The tone arm 35 is moved to initial playing position. The carriage 36 moves to the right, bringing the frame 32 back to its position in the stack. During this movement, the shaft 38 is rotated through one revolution, and means hereinafter described arrests the shaft 38 at a selected position with the arm 39 corresponding to the record selected directed towards the stack.

Consequently, this particular arm 39 engages its corresponding individual member 37 and connects the selected record to the carriage 36. The carriage 36 then moves to the left and the sliding frame carrying the selected record is moved into alignment with the turntable. The turntable now rises and the controlling clutch is disengaged so that the rotation of the cam shaft ceases. The record is now played and at the end of playing, the tone arm 35 releases the controlling clutch so that the cam shaft 34 is again put into operation.

It may here be noted that when the cam shaft 34 thus resumes movement, a switch 41 opens which may or may not have the result of stopping the motor 40, depending upon mechanism hereinafter described. If the motor 40 continues to rotate or is again put into operation, the record-changing cycle is completed, the turntable descending, the carriage 36 moving to the right, and returning the sliding frame and record to the stack. At the same time, the shaft 38 is rotated by means providing slippage. Another sliding frame is engaged by its individual member 37 and the selected record is brought out for playing in the manner previously described.

The shaft 38 carries at its lower end a coupling 42 which receives the upper end of a rod 43. The lower end of the rod is connected to a coupling 44 (Fig. 25) which is secured to the upper end of spindle 45. The connections 42 and 44 are such that the shaft 38 is connected to the spindle 45 so that they rotate together. The couplings 42 and 44 are oppositely directed but are similar in construction and can be best understood with reference to Figure 25 which shows the coupling 44.

The coupling 44 comprises a collar 46 which is rigidly secured to the spindle 45. The collar 46 rigidly carries a yoke 47, the ends of which are connected at diametrically opposite points to a disc 48 of rubberized fabric. A bridge member 49 (Fig. 26) is connected to the disc 48 at diametrically opposite points on a diameter at right angles to the points of connection of the yoke 47.

The bridge member 49 is provided with a boss 50 in alignment with the spindle 45, this boss having a semi-circular opening 51 for the reception of a semi-cylindrical end 52 on the lower end of the rod 43. As shown in Figure 25, a spring-pressed ball 53 normally bears against the lower end 52 of the rod 43 so as to prevent any movements of the rod 43 relative to the boss 50.

The upper end of the rod 43 is provided with a similar semi-cylindrical upper end 52 which is, however, substantially longer than the semi-cylindrical lower end 52. The rod 43 may be removed by merely moving it upwardly so as to withdraw the lower end 52 out of the boss 50. The rod 43 may then be deflected rearwardly and its upper end may be withdrawn from the boss 50 of the coupling 42. It may be noted that the lower coupling member 44 is reenforced by a bridge member 54' which is located below the disc 48 and lies parallel to the bridge member 49.

In the upper coupling 42, the bridge member 54 is omitted so as to enable the elongated upper end 52 to move upwardly into position within the upper yoke 47 in order to effect the removal just described and the corresponding reinstallation. The structure of the rod 43 and the couplings 42 and 44 enables the shaft 38 to be removed and reinstalled without affecting the adjustment between the shaft 38 and spindle 45. It may be noted that this adjustment is determined by the relation between the collar 46 and the spindle 45 and that this adjustment is accurately made during assembly.

Upon the collar 46 is rigidly mounted a disc 54 which carries on its under side a disc 55 of insulating material. Upon the under side of the disc 55 are mounted two conducting rings 56 and 57 which are secured in position by lead-out elements 58 and 59 respectively, which extend upwardly through the disc 55 and are located within cutouts 60. On the under side of the disc 55 is mounted an abutment member 61 which is adapted to engage any of the pins 62 (Fig. 21) which may be displaced upwardly. It will be understood that when such engagement occurs, the disc 54 is held stationary; likewise the rod 43 and the shaft 38.

Consequently, the shaft 38 will be located in a definite position with one of the arms 39 directed towards the stack of the records, this being the only arm 39 which is in effective position. The connection is such that the particular arm 39 which is in operative position corresponds to the particular arresting pin 62. Upon the upper side of the disc 54 is mounted a relay 63 which is connected to the rings 56 and 57 by means of one of the lead-out elements 58 and one of the lead-out elements 59.

Figure 18:
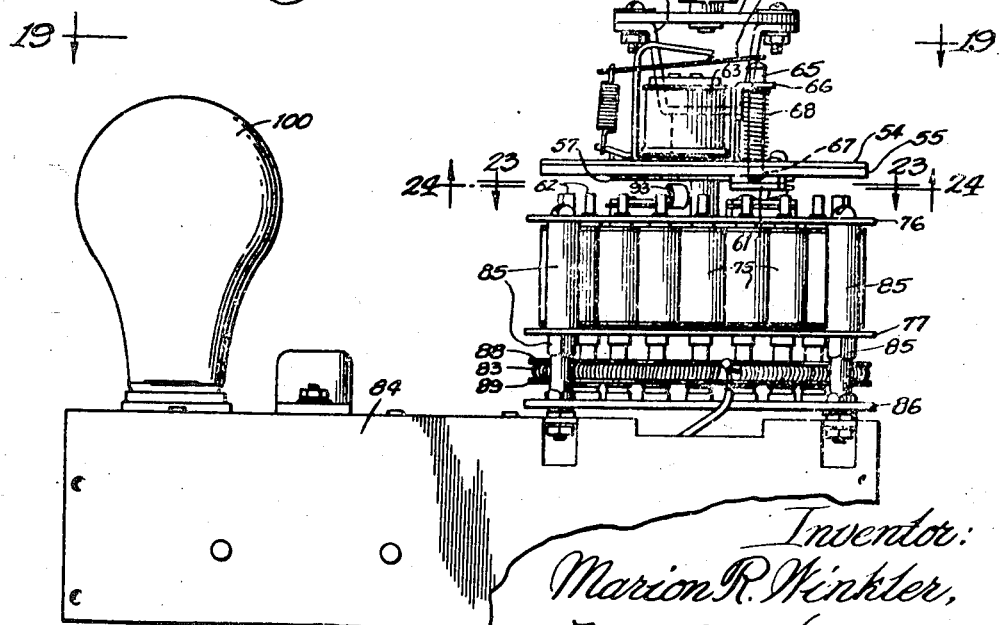
Fig. 18 is an elevational view of the solenoid assembly, the armatures of which determine which record or records are to be played.

When the relay 63 is energized, its armature 64 (Fig. 18) moves downwardly and forces a pin 65 downwardly. The pin 65 is guided in an opening in a bracket 66 and in an opening 67 which extends through the discs 54 and 55. As best seen in Figure 24, the opening 67 is located immediately ahead of the effective portion of the abutment 61.

Consequently, when the disc 54 is arrested by the engagement of the abutment 61 with an upwardly displaced pin 62 as shown in Figure 21, the pin 65 is in alignment with the effective pin 62. The pin 65 is biassed upwardly by means of a coil spring 68 which bears against the disc 54 and against a collar 69 rigidly mounted on the pin 65.

The bracket 66 serves as a stop for the pin 65 since it is engaged by the collar 69 in the normal position of the pin 65. It will be understood with reference to Figure 21 that when the relay 63 is energized, the pin 65 is moved downwardly and the upwardly displaced pin 62 in alignment therewith is moved downwardly to normal position.

It may here be noted that the shaft 38 is driven by the movement to the right of a bar 70 which is actuated by a cam 71 on the cam shaft 34. The operative connection between the bar 70 and the shaft 38 need not be described in detail.

It may be remarked that the movement of the bar 70 to the right as viewed in Figure 2, causes the shaft 38 to rotate in the clockwise direction as viewed from above in Figure 2, that this drive includes a friction element which enables the bar 70 to move when the shaft 38 is held against movement by one of the pins 62, and that one-way clutch means are provided in the drive so that the bar 70 may move to the left as viewed in Figure 2, without affecting the shaft 38.

It is to be noted that the cam 71 is provided with a small projection 72 located on its lower or innermost rest. The projection 72 is so arranged that it engages the cam roller 73, which is carried by the bar 70, after the bar 70 has moved to the left, and after the relay 63 has been energized to discharge the pin 62 which has arrested the shaft 38. Consequently, the projection 72 moves the bar 70 slightly to the right and immediately allows it to move to the left. This slight movement to the right causes a slight rotation of the shaft 38 and the result is that the abutment 61 is given an additional slight movement in the clockwise direction so that it is moved past the position of the pin 62 which had stopped it and into a position between that pin 62 and the next pin 62 in the clockwise direction.

This slight movement of the abutment 61 is very important since it insures patrons of hearing the selection which they desire. Thus, if one selection is extremely popular, a large number of patrons might keep selecting that particular recording and thus if a coin were inserted and the appropriate pin 62 were pushed upwardly, it would be possible to keep the phonograph operating while preventing the shaft 38 from turning at all. Other patrons who made selections, causing other pins 62 to move upwardly, would not get their selection.

However, the slight movement of the shaft 38 and consequently of the abutment 61 past the pin 62 which last arrested the abutment 61, insures that the selections corresponding to the other pins 62 which may have been moved upwardly by selecting operations, will be played before the last played record will be repeated.

The pins 62 which correspond in number to the number of sliding frames 32 and consequently to the number of records in the phonograph, are arranged in a circle being located within bushings 74 for free axial movement. The bushings 74 are located in the upper ends of a series of solenoids 75 which are supported between two plates 76 and 77 as best seen in Figure 21.

The bushings 74 are secured to the upper plate 76 so as to depend therefrom. Each solenoid 75 comprises an internal brass sleeve 78 around which the winding is located. The sleeve 78 projects downwardly through an opening in the lower plate 77 and its upper end engages the under side of the upper plate 76.

The pins 62 are of non-ferrous material. These pins 62 rest upon the armatures of the solenoids. The armature consists of an iron rod 79, the lower end of which is reduced, as shown at 80. This reduced lower end 80 carries a collar 81 of insulating material and a collar 82 of metal. The collar 82 is preferably waisted so as to cooperate with a coil spring 83 in the manner shown at the right-hand side of Figure 21.

In its normal condition, the armature 79 occupies the position shown in the left-hand side of Figure 21. It will be noted that in this relation, the armature is insulated from the spring 83. When the solenoid 75 is energized, the armature 79 moves upwardly into the position shown in the right-hand side of Figure 21, raising the pin 62 into position to cooperate with the abutment 61. The armature is held in this elevated position by the engagement of the spring 83 with the waisted surface of the collar 82. Consequently, the pin 62 remains elevated until it is pushed downwardly by the pin 65 in the manner previously described.

The solenoids are mounted upon a housing 84 by means of bolts and spacing members 85. These bolts and spacing members also serve to support below the plate 77 and in spaced relation thereto, a plate 86 of insulating material. The plate 86 is provided with a central opening as shown in Figure 20 around which are arranged contact pieces 87 corresponding to the individual records. These contact pieces are connected to the individual solenoids 75.

Between the plates 77 and 86 are mounted two plates 88 and 89 which are supported from the plate 77 and insulated therefrom by supports 90. The plates 88 and 89 are spaced for the reception between them of the spring 83 previously referred to. It will thus be seen that when one or more of the armatures 79 is in its elevated position, that is the position shown in the right-hand side of Figure 21, the plates 88 and 89 are electrically connected through one or more of the conductor sleeves 82 to one or more of the armatures 79 and through these armatures to ground.

When none of the armatures 79 is in upward position, the plates 88 and 89 and the spring 83 are disconnected from ground. The other ends of the solenoids, that is, the ends other than those connected to the contacts 87, are connected to a common ring 91 which is carried by insulating members 92 on the plate 77. The common ring is connected by means of a conductor (not shown in Fig. 21) which extends downwardly through openings in plates 77, 88 and 89 and through the central opening in the plate 86. The connection of this conductor will be best understood in connection with the wiring diagram.

On its upper side, the plate 76 carries two brushes 93 and 94 which are mounted in insulated relation to the plate 76. These brushes are connected to conductors which likewise extend downwardly through openings in the stationary plates 77, 88, 89 and through the central opening in the stationary plate 86, being connected as will hereinafter appear in connection with the wiring diagram.

The brush 93 is arranged to co-operate with the conductive ring 56, the brush 94 being arranged to co-operate with the conductive ring 57. The contacts 87 are connected to the terminals of a 27-prong receptacle 9E, other connections being connected to this receptacle, as will be fully described in connection with the wiring diagrams.

It may here be noted that in the wiring diagram I have applied to the solenoids 75 the numbers 1 to 20 in consecutive order, and have applied the same numbers to the corresponding terminals of the receptacle 95. The spring 83 is connected to a conductor 96 which extends into the housing 84.

The housing 84 contains the motor relay 97 which, when energized, closes the motor switch 98. The housing 84 also includes a power transformer 99 and on its upper side carries a socket for an incandescent lamp 100.

The selector unit, designated generally by the reference numeral 101, is mounted in the upper front part of the cabinet, as shown in Figure 1. This selector unit comprises a main frame plate 102 which is best shown in Figure 3. This main plate serves as a mounting for four banks of switches 103, each bank comprising five individual switches. Two banks are located in the middle of the plate 102 and a bank is provided at each end.

The plate 102 is provided with openings 104 for the reception of suitable title-holding means 105 (Fig. 1). The title-holding elements are illuminated by means of lamps 106 mounted in sockets carried by an angle member 107 mounted on rearwardly extending flanges 108 integral with the frame plate 102 and extending rearwardly from the lower edges of the openings 104.

Upon the upper side of the horizontal web of the angle member 107, is mounted a play counter 109, the effective spindle of which extends downwardly through an opening in said web. Upon the forward, or inner, side of the downwardly extending web of the angle member 107, are mounted a relay 110, which is adapted when energized to close a switch 111 and to close a switch 112 and open an associated switch 112', a cancel solenoid 113, a credit ratchet wheel 114 which is adapted to control switches 115 and 116, a credit electromagnet 117, a switch 118, and a relay 119 which is adapted, when energized, to close a switch 120 and open a switch 121.

The ratchet wheel 114 is biassed in a clockwise direction, as viewed in Figure 5, that is, as viewed from the front of the phonograph cabinet, by a spring 122. The ratchet wheel carries a rearwardly projecting pin 123 which, in normal position, engages the switches 115 and 116 so as to hold them open as shown in Figure 5.

The ratchet wheel 114 is maintained in this position by means of an escapement member 124 pivotally mounted at 125. This escapement member carries the armature 126 of the electromagnet 117. The armature is biassed away from the electromagnet 117 by means of a spring 127.

It will readily be understood that each time the credit magnet 117 is energized momentarily, the escapement member 124 is oscillated and the spring 122 moves the ratchet wheel 114, one tooth in the clockwise direction as viewed in Figure 5. This movement moves the pin 123 away from the switches 115 and 116 so that these switches close. Furthermore, if the electromagnet 117 is energized a plurality of times in succession, the pin 123 is moved away from the switches 115 and 116 by a corresponding number of teeth spaces on the ratchet wheel 114.

The armature 128 of the cancel solenoid 113 is pivotally connected to a bar 129 which is mounted in suitable guide members carried by the angle member 107 for axial movement. The bar 129 pivotally carries an angle lever 130, one arm of which carries a rearwardly extending detent 131 which is adapted to cooperate with ratchet wheel 114. The other arm of the lever 130 is biassed to the right, as viewed from the front, that is, as viewed in Figure 5, by a spring 132, this spring being connected to the lever 130 near its pivotal support upon the bar 129.

When the solenoid 113 is deenergized, the spring 132 pulls the bar 129 and the lever 130 to its extreme right-hand position, as shown in Figure 5. In this position, the downwardly depending arm of the lever 130 engages an abutment 133. The effect of this engagement is to raise the upper arm of the lever 130 until its detent 131 engages the bar 129. The detent is thus clear of the ratchet wheel 114 so that the same is free to move in response to an actuation of the credit magnet 117.

When, however, the cancel solenoid 113 is energized, the bar 129 moves to the left, as viewed in Figure 5, and the lever 130 swings in a counterclockwise direction owing to the tension of the spring 132 and the movement of the lever 130 to the left away from the abutment 133. Consequently, the detent 131 descends into contact with the ratchet wheel 114 and, during the subsequent movement of the bar 129 to the left owing to the energization of the cancel solenoid 113, the ratchet wheel 114 is rotated one tooth in the counterclockwise direction.

It will thus be understood that if the magnet 117 has been energized a certain number of times, and thereafter the cancel solenoid 113 is energized the same number of times, then the ratchet wheel 114 will be moved back to its initial position and its pin 123 will open the two switches 115 and 116.

The bar 129 is provided with a rearwardly sloping cam portion 134 which is adapted to close the switch 118 at the beginning of the movement of the bar 129 to the left each time the solenoid 113 is energized.

As shown in Figure 9, the spindle 135 of the play counter projects downwardly through an opening in the upper web of the angle member 107. At its lower end a finger member 136 (Figure 8) is mounted for free movement. The finger member 136 is normally in the position in which it is shown in Figure 8. When the bar 129 moves to the left, as viewed in Figures 5 and 8, an abutment 137 carried by the bar 129 engages the finger 136 and swings it in counterclockwise direction, as viewed in Figure 8, or in clockwise direction, as viewed from above.

The finger member 136 carries an upwardly projecting member 138 which is normally in engagement with a set screw 139 carried by a collar 140 rigidly mounted on the spindle 135. Between the collar 140 and the finger member 136, the spindle 135 carries a coil spring 141, one end of which engages another set screw 142 on the collar 140, the other end engaging the upward projection 138 of the finger member 136.

The arrangement is such that when the bar 129 moves to the left, as viewed in Figure 5, the abutment 137 engages the finger 136 and rotates the spindle 135 in clockwise direction, as viewed from above, through the action of the spring 141. When the spindle 135 has been moved to its full extent, continued movement of the bar 129 to the left as viewed in Figure 5 merely causes the upwardly extending projection 138 to move away from the set screw 139.

When the bar 129 returns to normal position, the projection 138 again engages set screw 139 and the spindle 135 of the play counter 109 is again returned to normal position, the net result of the operation being to increase the indication of the play counter by one.

As shown in Figure 3, the ratchet wheel 114 and associated parts are substantially enclosed within an angle housing member 143 which is secured to the angle member 107. The ratchet wheel 114 carries a forwardly extending axial hollow member 144 which projects through a suitable opening in the housing 143 as best seen in Figure 6. The hollow member 144 receives a bearing 145 which is secured in place by a set screw 146.

The bearing 145 rotatably receives a spindle 147 which is held against removal from the bearing by a washer 148. The spindle 147 is provided with an enlarged shoulder which engages the outer end of the bearing. At its outer end the spindle 147 has rigidly secured thereon a transparent or translucent disc 149 the outer peripheral portion of which is unobscured.

This peripheral portion carries indicia corresponding to the number of the selections for which the machine is adapted, in the present instance twenty. These indicia are spaced so as to correspond with the position of the teeth of the ratchet wheel 114. Thus, the ratchet wheel 114 may have twenty-one teeth and numbers 1 to 20 and also a blank space may be located in equiangular relation around the disc 149 as shown in Figure 3.

A pin 205 rigidly carried by the spindle 147 is normally held against a pin 206 mounted on the hollow member 144 by a spring 206' anchored to the spindle 147 and to the pin 206.

The front of the cabinet is provided with an opening 150 (Fig. 1) which, in the normal condition of the machine, is in alignment with the blank space on the disc 149. When the credit magnet 117 is energized momentarily, the ratchet wheel 114 is moved one tooth in the clockwise direction as viewed in Figure 5, and consequently the number 1 appears in the opening 150. When the credit magnet 117 is energized momentarily a plurality of times, for example five times, the corresponding number appears at the opening 150.

The translucent disc 149 is illuminated by lamps 151 carried by the housing member 143 as shown in Figure 4.

The banks of switches are similar in construction and one of them will be described in connection with Figures 12 to 17 inclusive. Each bank includes a frame comprising a front bar 152, a rear bar 153, and end members 154 and 155. A longitudinal bar 156 extends through the frame, being rigidly secured to the end members 154 and 155. Two strips of insulation 157 and 158 are rigidly secured to the end members 154 and 155 so that these strips extend along the exterior of the switch assembly.

The front bar 152 is provided with five openings 159 through which extend forwardly the shank portions 160 of switch bars 161. Each switch bar 161 is provided with an opening 162 through which passes the bar 156. The main body of the bar 161 is provided near its inner or rear end with an enlarged opening 163 through which the rear bar 153 extends. The bar 161 comprises a forwardly projecting finger 164 which extends from the rear end of the opening 163 forwardly in the axial direction of the bar 161.

The bar 153 is provided with openings 165 through which the finger 161 projects in guiding relation. The bar 161 comprises a projection 166 which extends from the forward end of the opening 163 in alignment with the finger 164. A coil spring 167 engages the projection 166 and finger 161, this spring bearing against the rear bar 153 so that the bar 161 is biassed forwardly.

The bar 161 adjacent its shank portion 160 carries a resilient washer 168 which normally abuts against the front bar 152 in the manner shown in Figures 16 and 17. The shank 160 carries at its outer end a shank 169 preferably of transparent material. This shank 169 carries an enlarged head 170 which is suitably of substantially square cross-section, the sides of the square being, however, concaved to provide a head with four projecting corners over which is adapted to be forced a hollow member 171. Before the hollow member 171, which is also preferably transparent, is forced over the head 170, a small piece of translucent material 172 is inserted in the hollow member so that it will occupy the position in which it is shown in Figure 16.

The piece of translucent material may suitably carry indicia corresponding to the number of the record with which particular switch bar 161 is associated. The shank 169 extends outwardly through an opening 173 in a translucent strip 174. This strip extends along the length of the bank of switches, closing an opening 175 which is provided in the frame plate 102. It will be understood that the buttons constituted by the members 170 and 171 are illuminated through the transparent shank 169 from the lamps 106 and consequently the indicia strip 172 is illuminated and the operator can see the numbers of the various switches.

Each switch bar 161 carries on opposite sides a pair of strips 176 and 177 of insulating material. The strips of each bar 161 carry the contacts 178, 179, 180 and 181. As best seen in the wiring diagram, the contact 178 is normally in engagement with two contacts 182 and 183 and when bar 161 is pressed inwardly, the contact 178 is adapted to connect contact 183 to contact 184. The contact 184 is normally engaged and likewise a contact 185 by the contact 179. When the bar 161 is pressed inwardly, the circuit between the contact 184 and the contact 185 is broken.

The contact 180 is normally in engagement with a contact 186. When the bar 161 is pressed inwardly, the contact 180 connects the contact 186 to a contact 187. The contact 181 is normally in engagement with contacts 188 and 189. When the bar 161 is pressed inwardly, the contact 181 moves out of engagement with the contact 189 but remains in engagement with the contact 188 and connects this contact to a contact 190.

It is to be noted that when the switch bar 161 is pushed inwardly, the contact 178 breaks from the contact 182 before the contact 178 moves into engagement with the contact 184. The contact 179 clears the contacts 184 and 185 before the contact 184 is engaged by the contact 178. It is further to be noted that contact 180 engages contact 187 early, preferably about the same time that contact 178 clears the contact 182, and that the contact 180 engages contacts 186 and 187 for a substantial period during the normal return of the bar 161. Furthermore, contact 178 engages contact 184 and contact 180 engages contact 187 before the contact 181 moves into engagement with the contact 190.

It is to be noted that each contact 183, except that corresponding to recording Number 20, is connected by a bridge piece 191 to the contact 182 of the adjacent switch bar. Contact 183 corresponding to switch Number 20 is connected to a conductor 192. All the contacts 178 are thus normally connected in series. The contacts 179 are connected in a similar series by means of bridge pieces 193 which connect the contact 185 of one switch to contact 184 of the adjacent switch.

The opposite end of this series, that is, the end remote from switch Number 20, is connected to a conductor 194. It will thus be seen that when one of the switch bars 161 is pressed inwardly, for example, switch bar Number 7, then its contact 179 breaks the circuit of the bridge pieces 193 and contacts 179 at switch Number 7. The circuit comprising the bridges 191 and contacts 178 is then broken at switch Number 7 and the right-hand portion of the last circuit is connected to the left-hand portion of the 193, 179 circuit, so that the conductor 192 is connected directly to the conductor 194. It is to be noted that this connection will not be complete if two switch bars are pushed in simultaneously.

Thus, if the switch bar corresponding to record Number 20 is pushed in, and the switch bar corresponding to record Number 19 is likewise pushed in, then contact 178 of switch bar Number 20 breaks contact with the bridge piece 191 so that conductor 192 is only connected to the bridge piece 193 between the switches corresponding to records Numbers 19 and 20. It is to be noted, however, that no element of the switch corresponding to record Number 19 is in contact with this bridge member 193, so that no circuit is completed from conductor 192 to conductor 194 when two switches are pushed inwardly.

The contacts 186 are connected to a conductor 195 which extends along the whole series of contacts 180, this conductor being connected, at the end corresponding to the switch Number 20, to a conductor 196. The contacts 187 are connected to a conductor 197 which is likewise connected, at the end corresponding to switch Number 20, to a conductor 198.

Adjacent contacts 188 and 189 normally associated with the contacts 181, are connected by bridge pieces 199. The left-hand contact 188, that is, the contact associated with switch Number 5 at the left-hand side of the series of contacts 181 as shown in the wiring diagram, is connected to the conductor 194. The individual contacts 190 are connected, by conductors 200, to corresponding prongs of a plug 201 which is adapted to cooperate with the receptacle 95, the conductors 200 and also the conductors 202, 203, and 204 being formed into a stout cable which extends from the front top portion of the cabinet down to the location of the housing 84. It may here be noted that conductors 202, 203 and 204 are connected to prongs of the plug 201 numbered 21, 22 and 23 respectively.

It will of course be understood that the contacts 178, 179, 180 and 181, which are arranged in series as shown in the wiring diagram, need not be arranged in the particular series shown or in numerical order. It is, however, to be noted that the conductor 192 is connected to one side of the series and conductor 194 is located at the opposite side of the series. Each contact 190 corresponding to a recording of a certain number is connected to the prong of corresponding number on the plug 201.

The stationary contacts 182, 183, 184, 185, 186, 187, 188 and 190 are mounted on the strips 157 and 158 of insulating material, so as to cooperate with the contacts 178, 179, 180 and 181 carried on the strips 176 and 177 which are rigidly mounted on the bar 161. The bridge members 191, 193 and 199, and likewise conductors 195 and 197, are mounted on the strips 157 and 158.

Conductor 192 is connected to one side of the normally closed switch 121. The other side of this switch is connected to one side of the relay 110. The other side of the relay 110 is connected to one side of the switch 116. The conductor 192 is also connected, through a resistor 207, to one side of the normally open switch 111.

The conductor 196 is connected to one side of the normally open switch 118, to one side of the normally open switch 120, and to the other side of the normally open switch 111. The other sides of the switches 118 and 120 are connected together and to one side of the relay 119. The other side of the relay 119 is connected to conductor 204. The conductor 198 is connected to the conductor 203.

The other side of the switch 116 is connected, through the lamps 151, to one side of the normally open switch 115 and it is also connected to the common pole of the switches 112 and 112' and to conductor 204. The other side of the switch 112 is connected to the cancel solenoid 113, the other side of which is connected to the conductor 203. The other side of the switch 112' is connected to one side of the credit magnet 117. The other side of the credit magnet is connected to conductor 202. The other side of switch 115 is connected, through a resistor 208, to conductor 203. Conductors 202 and 204 may suitably be connected through a resistor 231. This resistor may suitably have a resistance of 100 ohms. Resistor 207 may suitably have a resistance of 300 ohms, while resistor 208 may suitably have a resistance of 600 ohms.

The ring 91 is connected by a conductor 209 to a terminal 210 on the housing 84. The terminal 210 is connected through a conductor 211 through the main switch 212 to the power line 213. The other power line 214 is connected to one side of the switch 98 and to a terminal 215 also in the housing 84.

The other side of the switch 98 is connected to one side of the motor 40 and to one side of the power supply for the amplifier 216. The power line 213 is connected through the switch 212 to the amplifier 216 and to the other side of the motor 40. The power line 213, on the outer side of the switch 212, is connected through a resistance lamp 217, to one side of a series of coin switches 218. The other sides of the switches 218 are connected to contact number 21 of the receptacle 95.

Switches 218 are adapted to be closed momentarily by coins descending through coin chutes 219, 220 and 221. The chute 219 corresponds to the nickel chute and the coin descending therethrough closes one of the switches 218. The chute 220 corresponds to a dime chute and a coin passing therethrough closes two of the switches 218. The chute 221 corresponds to a quarter chute and a coin descending therethrough closes five switches 218.

It will of course be understood that the showing of these switches and chutes is quite diagrammatic and they may be arranged in any well-known way. The coins are introduced into the chutes by means of a coin chute assembly 222 shown in Figure 1.

One side of the motor relay 97 is connected to the secondary of the transformer 99, the other end of the secondary being grounded. The other side of the relay 97 is connected by conductor 56 to the annular spring 83 and also through an outlet 223 on the housing 84 and a plug 224 to one side of the switch 41. The other side of the switch 41 is grounded through the same receptacle and plug.

The primary of the transformer 99 is connected to the two terminals 210 and 215. Consequently, the transformer 99 is energized whenever the switch 212 is closed. The transformer 99 provides 6-volt current for the operation of the motor relay 97.

The terminal 215 is connected to contact No. 23 on receptacle 95. The terminal 210 is connected to contact No. 22. The terminal 215 is connected to brush 93 and terminal 210 is connected, through resistance lamp 100, receptacle 223, and plug 224, to one side of a normally open switch 225. The other side of this switch is connected, through the plug 224 and receptacle 223, to brush 94.

The switch 225 is mounted on a suitable part of the chassis and is adapted to be closed in an early part of the record-changing cycle. Thus, as shown in Figure 2, the switch 225 may be located so that it is closed when the carriage 36 is in its right-hand position and has just been connected by engagement of one of the arms 39 and the corresponding member 37 to the corresponding sliding frame 32.

The pick-up of the player arm 35 is connected, through a volume control 226, to the amplifier 216. The pick-up 35 is shorted during the record-changing operation by a switch 227 which is adapted to be closed by a cam 228 mounted on the cam shaft 34. The amplifier 216 is connected to the speaker units of which two are shown, being designated 229 and 230.

The operation is as follows: It is to be noted that if a player inserts a coin in any of the coin chutes 219, 220, 221, even when switch 212 is open, he does not lose his money, because the circuit is completed from power line 213, through resistance lamp 217, switches 218, position No. 21 on the receptacle 95 and plug 201, credit magnet 117, switch 112', conductor 204, position No. 23, terminal 215 and power line 214. This circuit is completed each time a switch 218 is closed, whether switch 212 is open or closed.

In normal operation, switch 212 is closed. The energization of magnet 117 actuates the escapement 124 and permits the spring 122 to move the credit ratchet wheel 114 one tooth in the clockwise direction as viewed in Figure 5 each time that a switch 218 is closed.

The first movement of the ratchet wheel 114 away from initial position, closes switches 115 and 116. This movement of the ratchet wheel 114 moves the indicating disc 149 so that the corresponding indicia is presented through the opening 150. When the switch 115 is closed, the lamps 151 are lit, thus illuminating the disc 149 and bringing attention to the fact that the player has established credit.

Thus, if a quarter is inserted in the appropriate coin chute, the machine will indicate at the opening 150 that the player can make five selections. The player now proceeds to actuate buttons 172 corresponding to the selections he desires. Thus, if he presses inwardly button 172 corresponding to recording No. 7, the corresponding contact 179 breaks contact between the adjacent contacts 184 and 185 and then the contact 178 engages the contact 184.

Consequently, the series of contacts 178 to the left of that contact corresponding to recording No. 7, are disconnected and all the contacts 179 to the right of this position are disconnected. Conductor 192 is thus connected to conductor 194 through the right-hand part of the series of contacts 178 and the left-hand part of the series of contacts 179 as shown in Figure 27.

If two buttons are pushed simultaneously, this circuit will not be completed for the reason previously set forth, so that the player is obligated to push one button only at one time. During the inward pushing of the button No. 7, the contact 180 connects line 198 to line 196. After the contact 178 has connected line 192 to line 194, and after contact 180 has connected line 196 to line 198, the contact 181 makes engagement with contact 190.

Consequently, the following circuit is made through the solenoid 75 corresponding to recording No. 7: Power line 213, switch 212, conductor 211, terminal 210, conductor 209, solenoid 75 (No. 7), conductor 200 (No. 7), contact 190 (No. 7), contact 181 (No. 7), the series of contacts 181 and bridge pieces 199 to the left of switch 7 as viewed in Figure 27, conductor 194, contacts 179 and bridge pieces 193 to the left of switch No. 7, contact 178 of switch No. 7 and the series of contacts 178 and bridge pieces 191 to the right of switch 7 in Figure 27, conductor 192, normally closed switch 121, relay 110, switch 116, conductor 204, terminal 215, and power line 214.

Consequently, solenoid 75 (No. 7) is energized and the corresponding pin 62 is moved upwardly in the manner shown on the right in Figure 21. Relay 110 is energized simultaneously with the solenoid 75 (No. 7) and consequently switches 111 and 112 are closed and switch 112' is opened. When conductor 196 is connected to conductor 198 by contact 180, which connection is made slightly before the contact 178 engages contact 184, and when the relay 110 is energized by engagement of the contacts 178 and 184, a circuit is completed from terminal 215, conductor 204, switch 116, relay 110, closed switch 121, resistor 207, switch 111, conductor 196, contacts 186, 180, 187, conductor 198, conductor 203, and terminal 210.

This circuit is maintained for a substantial period owing to the long period of make which the contact 180 has with contact 187 during the return movement of the bar 161. Consequently, the relay 110 is energized for a substantial period even if the bar 161 is poked in and released very rapidly. As a result, the cancel solenoid 113 is definitely energized each time a switch bar 161 is pushed inwardly.

The relay 110, and consequently the relay 113, are deenergized in one of the following manners: First, if the selection in question is the last selection which has been paid for, then the energization of the cancel solenoid 113 moves the pin 123 into the position in which it is shown in Figure 5, thus opening the switch 116. This occurs even if the selector button is held in. Second, if the finger is taken off the selector button, the two circuits just referred to are broken. Thirdly, if the credit ratchet 114 is in position for selection of more than one record and the finger is kept on the switch button, then the cam 134 on the bar 129 closes the switch 118 and the relay 119 is energized, opening the switch 121 and breaking the two circuits referred to. The relay 119 remains energized as long as the switch bar 161 is held inwardly, the circuit being completed from conductor 203 through conductor 198, contact 180, conductor 196, switch 120, relay 119 and conductor 204.

When the selector switch bar 161 returns to normal position, the elements resume initial position and a further selection may be made if credit is available, or further coins may be inserted in the coin chute to make such credit available. The actuation of a plurality of switch bars 161 results in the projection of the corresponding pins 62.

Whenever any of the pins 62 is displaced upwardly, a circuit is completed through the secondary of the transformer 99, relay 97, spring 83, collar 82 to ground. Consequently, the motor 40 remains in operation while any pin 62 is in the upper position as shown in the right of Figure 21.

When the machine is put into operation by the closing of the switch 98, the frame 36 moves to the right as viewed in Figure 2, bringing the last played record into the stack. While this movement of the carriage 36 is occurring, the shaft 38 is given less than a full rotation until the abutment 61 strikes a projected pin 62. The shaft 38 is thus arrested, its drive including friction means, with the arm 39 corresponding to the engaged pin 62 directed so as to cooperate with the corresponding engaging means 37.

After this engagement is effected, the carriage 36 closes the switch 225 and the relay 63 is energized, thus discharging the arresting pin 62. After this discharge, the projection 72 on the cam 71 effects a slight angular movement of the shaft 38 whereby the projection 61 is moved to an intermediate position beyond the last actuated pin 62.

The continued rotation of the cam shaft 34 brings the frame 36 to the left, as viewed in Figure 2, carrying with it the sliding frame 32, corresponding to the selected record. This record is elevated by the turntable 33 into playing relation with the player arm 35 and the record is played, the drive of the cam 34 being interrupted during the playing of the record.

After the record is played, the record-changing cycle is initiated by connection of the clutch controlled by the player arm, with the motor 40. This record-changing cycle continues in the same way the abutment 61 engaging the next actuated pin 62 so that the record corresponding thereto is played.

The phonograph will thus operate continuously playing the selected records one after the other. It is to be noted that when the last record is about to be played, the closing of the switch 225 discharges the last pin and consequently breaks the circuit of the relay 97 through the spring 83 and the collars 82. The relay 97 is not deenergized, however, since its circuit is completed through the switch 41. The last record is therefore played and after it is played the cam shaft 34 starts a recording-changing cycle which is, however, cut short by the opening of the switch 41.

The machine therefore remains out of operation until the circuit of the relay 97 is again completed through engagement of the ring 83 with one of the collars 82 as the result of deenergization of one of the solenoids 75.

Although the invention has been described in connection with the specific details of a preferred embodiment thereof, it must be understood that such details are not intended to be limitative of the invention except in so far as set forth in the accompanying claims.

Having thus described my invention, I declare that what I claim is:

1. In an automatic phonograph, in combination, a switch, displaceable stepping means arranged in its initial position to open said switch, coin-actuated means for displacing said stepping means away from initial position by a plurality of steps corresponding to the value of coins inserted, a plurality of selector means each individually corresponding to a record in the phonograph, said selector means being controlled by first said switch, individual selector members each arranged to be displaced when the first said switch is closed and the corresponding selector means is actuated, means actuated by each selector means for moving said stepping means back one step towards initial position on each actuation of a selector means, and means associated with each selector means arranged to cooperate when a plurality of said selector means are actuated simultaneously, to render all the selector means inoperative to actuate the individual selector members.

2. In an automatic phonograph, in combination, a switch, stepping means opening said switch in its initial position, coin-actuated means for controlling the movement of said stepping means away from initial position by a plurality of steps corresponding to the value of coins inserted, electromagnetic means for returning said stepping means step by step towards initial position, individual manually operable selector means each corresponding to an individual recording, means cooperating with said selector means for effecting selection of the corresponding recording, a relay controlled by said individual selector means and adapted to energize said electromagnetic means, and means on said selector means for maintaining the relay energized for a definite period after the selector means is released.

3. In a selector for automatic phonographs, in combination, a plurality of manually displaceable members each corresponding to an individual recording, an individual selector circuit associated with each displaceable member including an electromagnetic means, a selecting armature controlled thereby, switch means associated with each armature for putting the phonograph into operation, a set of switch means associated with said members and arranged in series, another set of switch means operatively associated with said members and arranged in series, said switch means being arranged to be actuated by a displaced member to interrupt both sets and to interconnect one part of one set to one part of the other set, means for supplying electrically energy to one end of one set and switch means operatively associated with each said member for connecting, on its displacement, said one part of the other set to its individual selector circuit.

4. In a selector for automatic phonographs, in combination, a plurality of manually displaceable members each corresponding to an individual recording, an individual selector circuit associated with each displaceable member including an electromagnetic means, a selecting armature controlled thereby, switch means associated with each armature for putting the phonograph into operation, three normally independent sets of switches operatively associated with said members, each set being arranged in series, means for supplying electrical energy to one end of one set, means for connecting one end of the other set to one end of the third set, said switches being actuated by displacement of one of said members to interrupt the first and second sets and to interconnect together the parts of said sets connected to said electrical supply means and said connecting means respectively, and to connect said third set to the selector circuit associated with said displaced member.

5. In a selector for automatic phonographs, in combination, a plurality of manually displaceable members each corresponding to an individual recording, an individual selector circuit associated with each displaceable member including an electromagnetic means, a selecting armature controlled thereby, switch means associated with each armature for putting the phonograph into operation, three normally independent sets of switches operatively associated with said members, each set being arranged in series, means for supplying electrical energy to one end of one set, means for connecting one end of the other set to one end of the third set, said switches being actuated by displacement of one of said members to interrupt the first and second sets and to interconnect together the parts of said sets connected to said electrical supply means and said connecting means respectively, and to connect said third set to the selector circuit associated with said displaced member after the first and second sets have been interrupted and their parts interconnected.

6. In a selector for automatic phonographs, in combination, a plurality of manually displaceable members each corresponding to an individual recording, an individual selector circuit associated with each displaceable member including an electromagnetic means, a selecting armature controlled thereby, switch means associated with each armature for putting the phonograph into operation, three normally independent sets of switches operatively associated with said members, each set being arranged in series, means for supplying electrical energy to one end of one set, means for connecting one end of the other set to one end of the third set, said switches being actuated by displacement of one of said members to interrupt the first and second sets and to interconnect together the parts of said sets connected to said electrical supply means and said connecting means respectively, and to interrupt said third set and connect the part thereof connected to said second set to the selector circuit associated with said displaced member.

7. In a selector for automatic phonographs, in combination, a plurality of manually displaceable members each corresponding to an individual recording, an individual selector circuit associated with each displaceable member including an electromagnetic means, a selecting armature controlled thereby, switch means associated with each armature for putting the phonograph into operation, three normally independent sets of switches operatively associated with said members, each set being arranged in series, means for supplying electrical energy to one end of one set, means for connecting one end of the other set to one end of the third set, said switches being actuated by displacement of one of said members to interrupt the first and second sets and to interconnect together the parts of said sets connected to said electrical supply means and said connecting means respectively, and to interrupt said third set and connect the part thereof connected to said second set, after the first and second sets have been interrupted and their parts interconnected, to the selector circuit associated with said displaced member.

8. In a selector for automatic phonographs, in combination, a coin actuated relay, ratchet means adapted to be displaced from initial position by said relay a number of steps corresponding to the value of inserted coins, a switch adapted to be opened by said ratchet means in its initial position, a second relay adapted to return said ratchet means step by step to initial position, a plurality of manually displaceable selector members each corresponding to an individual recording biased to inoperative position, a plurality of selector circuits each associated with a selector member, switch means associated with each member for energizing its associated selector circuit and energizing said second relay, the first mentioned switch being arranged to supply energy to said selector circuits, and slow opening switch means associated with said members establishing another circuit to supply energy to said second relay for sufficient time to insure its operation when a member is actuated quickly.

9. In a selector for automatic phonographs, in combination, a coin actuated relay, ratchet means adapted to be displaced from initial position by said relay a number of steps corresponding to the value of inserted coins, a switch adapted to be opened by said ratchet means in its initial position, a second relay adapted to return said ratchet means step by step to initial position, a third relay controlling the actuation of said second relay, a plurality of manually displaceable selector members each corresponding to an individual recording biased to inoperative position, a plurality of selector circuits each associated with a selector member, switch means associated with each member for completing a circuit energizing its associated selector circuit and energizing said third relay, the first mentioned switch being arranged to supply energy to said selector circuits, and slow opening switch means associated with said members establishing another circuit to supply energy to said third relay to supply energy to said second relay for sufficient time to insure its operation when a member is actuated quickly.

10. In a selector for automatic phonographs, in combination, a coin actuated relay, ratchet means adapted to be displaced from initial position by said relay a number of steps corresponding to the value of inserted coins, a switch adapted to be opened by said ratchet means in its initial position, a second relay adapted to return said ratchet means step by step to initial position, a third relay controlling the actuation of said second relay, a plurality of manually displaceable selector members each corresponding to an individual recording biassed to inoperative position, a plurality of selector circuits each associated with a selector member, switch means associated with each selector member for completing a circuit for energizing its associated selector circuit and energizing said third relay, the first mentioned switch being arranged to supply energy to said selector circuits, slow opening switch means associated with said members establishing another circuit to supply energy to said third relay to insure operation of the second relay when a member is actuated quickly, and means cooperating with said slow opening switch means and said second relay for opening both circuits of the third relay when a member is held in actuated position.

11. In a selector for automatic phonographs, in combination, a coin actuated relay, ratchet means adapted to be displaced from initial position by said relay a number of steps corresponding to the value of inserted coins, a switch adapted to be opened by said ratchet means in its initial position, a second relay adapted to return said ratchet means step by step to initial position, a third relay controlling the actuation of said second relay, a plurality of manually displaceable selector members each corresponding to an individual recording biassed to inoperative position, a plurality of selector circuits each associated with a selector member, switch means associated with each selector member for completing a circuit for energizing its associated selector circuit and energizing said third relay, the first mentioned switch being arranged to supply energy to the selector circuits, slow opening switch means associated with said members establishing another circuit to supply energy to said third relay to insure operation of the second relay when a member is actuated quickly, a fourth relay including switch means adapted to open both circuits of the third relay when a member is held in actuated position, and means controlled by said second relay cooperating with said slow opening switch means for energizing said fourth relay after the actuation of the second relay.

12. In a selector for automatic phonographs, in combination, a coin actuated relay, ratchet means adapted to be displaced from initial position by said relay a number of steps corresponding to the value of inserted coins, a switch adapted to be opened by said ratchet means in its initial position, a second relay adapted to return said ratchet means step by step to initial position, a third relay controlling the actuation of said second relay, a plurality of manually displaceable selector members each corresponding to an individual recording biassed to inoperative position, a plurality of selector circuits each associated with a selector member, switch means associated with each selector member for completing a circuit for energizing its associated selector circuit and energizing said third relay, slow opening switch means associated with said members establishing another circuit to supply energy to said third relay to insure operation of the second relay when a member is actuated quickly, a fourth relay including switch means adapted to open both circuits of the third relay when a member is held in actuated position, and a switch adapted to be closed by said second relay when energized in series with said fourth relay and said slow opening switch means whereby said fourth relay is energized when the slow opening switch means is held closed.

13. In a selector for automatic phonographs, in combination, a coin actuated relay, ratchet means adapted to be displaced from initial position by said relay a number of steps corresponding to the value of inserted coins, a switch adapted to be opened by said ratchet means in its initial position, a second relay adapted to return said ratchet means step by step to initial position, a third relay controlling the actuation of said second relay, a plurality of manually displaceable selector members each corresponding to an individual recording, a plurality of selector circuits each associated with a selector member, switch means associated with each selector member for completing a circuit for energizing its associated selector circuit and energizing said third relay, slow opening switch means associated with said members establishing another circuit to supply energy to said third relay to insure operation of the second relay when a member is actuated quickly, a fourth relay including switch means adapted to open both circuits of the third relay when a member is held in actuated position, a switch adapted to be closed momentarily by said second relay in series with said fourth relay and said slow opening switch means whereby said fourth relay is energized, and a switch, in parallel with last said switch, adapted to be closed by said fourth relay whereby said fourth relay is maintained energized as long as said slow opening switch means is held closed.

14. In a selector for automatic phonographs, in combination, a coin actuated relay, ratchet means adapted to be displaced from initial position by said relay a number of steps corresponding to the value of inserted coins, a switch adapted to be opened by said ratchet means in its initial position, a second relay adapted to return said ratchet means step by step to initial position, a third relay controlling the actuation of said second relay, a plurality of manually displaceable selector members each corresponding to an individual recording, a plurality of selector circuits each associated with a selector member, three normally independent sets of switches associated with said members, each set being arranged in series, means for supplying electrical energy to one end of one set and to said third relay in series, means for connecting the opposite end of the other set to one end of the third set, said switches being actuated by displacement of one of said members to interrupt the first and second sets and to interconnect together the parts of said sets connected to the said electrical supply means and said connecting means respectively, to interrupt said third set and connect the part thereof connected to said second set to the selector circuit associated with said displaced member, after the first and second sets have been interrupted and their parts interconnected, a fourth set of slow opening parallel switches associated with said members and adapted to be closed thereby to establish a second circuit for the third relay to insure operation of the second relay when a member is actuated quickly, a fourth relay including switch means adapted to open both circuits of the third relay when a member is held in actuated position, a switch adapted to be closed momentarily by said second relay in series with said fourth relay and with said fourth set of switches whereby said fourth relay is energized, and a switch, in parallel with last said switch, adapted to be closed by said fourth relay whereby said fourth relay is maintained energized as long as any of said fourth set of switches is held closed.

15. In a selector for automatic phonographs, in combination, a plurality of selector members corresponding individually to recordings of the phonograph, a contact member on each selector member and stationary contact means connecting them in series, a second contact member on each selector and stationary contact means connecting them in series, a third contact on each selector member and contact means connecting them in series, a plurality of electromagnetic selector means each corresponding to a recording, and individual contacts connected to each electromagnetic means and normally adjacent the third said contact of the corresponding selector member, means connecting an end of the third series to an end of another series, means connecting the end of the remaining series opposite from said end of the last mentioned series to a source of energy and to said electromagnetic means, the third said contact being arranged, when its selector member is actuated, to connect the connected side of its series to its individual contact, the second said contact being arranged, when its selector member is actuated, to break its series, and said first contact being arranged, when its selector member is actuated, to break the first said series and to connect the connected side of the first said series to the connected side of the second said series.

16. In a selector for automatic phonographs, in combination, a plurality of selector members corresponding individually to recordings of the phonographs, a contact member on each selector member and stationary contact means connecting them in series, a second contact member on each selector and stationary contact means connecting them in series, a third contact on each selector member and contact means connecting them in series, a plurality of electromagnetic selector means each corresponding to a recording, and individual contacts connected to each electromagnetic means and normally adjacent the third said contact of the corresponding selector member, means connecting an end of the third series to an end of another series, means connecting the end of the remaining series opposite from said end of the last mentioned series to a source of energy and to said electromagnetic means, the third said contact being arranged, when its selector member is actuated, to break its series and to connect the connected side of its series to its individual contact, the second said contact being arranged, when its selector member is actuated, to break its series, and said first contact being arranged, when its selector member is actuated, to break the first said series and to connect the connected side of the first said series to the connected side of the second said series.

17. In an automatic phonograph adapted to play a plurality of records in succession, in combination, a plurality of actuable selector members, a motor for operating said phonograph, switch means controlled by each of said selector members, when actuated, to effect operation of said motor, a coin-controlled magazine switch adapted to condition said actuable selector members for a plurality of operations, and a plurality of selector switches each controlling a corresponding member, means cooperating with an actuated member to control the playing of the corresponding record, and means for returning said actuated member to initial position after said cooperation.

18. In an automatic phonograph adapted to play a plurality of records in succession, in combination, a plurality of selector members, electrical means, individual to each member, for actuating each member from normal position to actuated position, a motor for operating said phonograph, switch means individual to each selector member and operative in the actuated position thereof to close the motor circuit, a movable member adapted to move through a plurality of positions and adapted to control in each position the playing of a corresponding record, each said actuated member being adapted to engage said movable member and arrest same in the corresponding controlling position, and means on said movable member for returning the arresting member to initial position after said arrestment, magazine switch means adapted to condition said electrical means for a plurality of actuations, coin-controlled means for said switch, and switch means individual to each record controlled by last said switch means and controlling a corresponding actuable selector member.

19. In an automatic phonograph, in combination, a normally open switch, coin-controlled magazine means for controlling the opening and closing of said switch, a plurality of quick opening selector switches each controlling the selection of an individual recording connected in series with said switch, an electromagnetic means controlled by each individual selector switch for controlling the playing of a corresponding recording, and a plurality of slow opening selector switches, relay means controlled by each of said slow opening selector switches for actuating the magazine means step by step towards switch opening position.

20. In an automatic phonograph, having a credit magazine, coin-actuated means for establishing credit thereon, a credit cancelling electromagnetic means, individual selector means each corresponding to an individual recording, the combination of a quick opening switch means cooperating with said selector means for effecting selection of the corresponding recording, a relay adapted to energize said credit cancelling electromagnetic means, and slow opening switch means cooperating with the selector means for maintaining the relay closed for a definite period after the selector means is released and the first switch means has opened.

MARION R. WINKLER.

REFERENCES CITED

The following references are of record in the file of this patent:

UNITED STATES PATENTS

| Number | Name | Date |
|---|---|---|
| 1,137,399 | Goodrum | Apr. 27, 1915 |
| 2,234,937 | Wilcox | Mar. 11, 1941 |
| 2,265,124 | Andres | Dec. 9, 1941 |
| 2,285,061 | Shoemaker | June 2, 1942 |
| 2,038,963 | Seeburg | Apr. 28, 1936 |
| 2,122,550 | Adrian | July 5, 1938 |
| 1,972,985 | Gardner | Sept. 11, 1934 |
| 2,122,112 | Powell | June 28, 1938 |
| 1,950,108 | Harrington | Mar. 6, 1934 |
| 2,266,779 | Loughridge | Dec. 23, 1941 |
| 2,064,868 | Yeider | Dec. 22, 1936 |
| 2,255,216 | Henry | Sept. 9, 1941 |
| 2,104,032 | Green | Jan. 4, 1938 |

FOREIGN PATENTS

| Number | Country | Date |
|---|---|---|
| 795,638 | France | Jan. 8, 1936 |